United States Patent [19]

Hijikigawa et al.

[11] Patent Number: 4,894,698
[45] Date of Patent: Jan. 16, 1990

[54] FIELD EFFECT PRESSURE SENSOR

[75] Inventors: Masaya Hijikigawa, Yamatokoriyama; Shuji Miyoshi, Nara; Hisashi Akiyama, Tenri, all of Japan

[73] Assignee: Sharp Kabushiki Kaisha, Osaka, Japan

[21] Appl. No.: 338,545

[22] Filed: Apr. 17, 1989

Related U.S. Application Data

[63] Continuation of Ser. No. 227,489, Aug. 1, 1988, abandoned, which is a continuation of Ser. No. 921,196, Oct. 21, 1986, abandoned.

[30] Foreign Application Priority Data

Oct. 21, 1985 [JP] Japan ................................ 60-235945
Dec. 20, 1985 [JP] Japan ................................ 60-288200

[51] Int. Cl.$^4$ ..................... H01L 29/84; H01L 29/66; H01L 29/78; G01L 9/12
[52] U.S. Cl. ........................................ 357/26; 357/25; 357/23.6; 73/724; 361/283
[58] Field of Search ........................ 357/26, 25, 23.6; 73/724; 361/283

[56] References Cited

U.S. PATENT DOCUMENTS

| | | | |
|---|---|---|---|
| 3,436,492 | 4/1969 | Reedyk | 357/26 |
| 3,440,873 | 5/1967 | Eichelberger | 357/26 |
| 3,596,228 | 5/1969 | Read et al. | 357/26 |
| 3,886,584 | 5/1975 | Cook, Jr. et al. | 357/29 |
| 3,978,508 | 8/1976 | Vilkomerson | 357/26 |
| 4,287,501 | 9/1981 | Tominaga et al. | 357/26 |
| 4,397,714 | 8/1983 | Janata et al. | 357/23.15 |
| 4,411,741 | 10/1983 | Janata | 357/25 |
| 4,480,488 | 11/1984 | Read et al. | 357/26 |
| 4,495,820 | 1/1985 | Shimada et al. | 357/26 |
| 4,581,624 | 4/1986 | O'Connor | 357/26 |

FOREIGN PATENT DOCUMENTS 1278520 3/1966 Fed. Rep. of Germany .

*Primary Examiner*—Rolf Hille
*Assistant Examiner*—Robert P. Limanek
*Attorney, Agent, or Firm*—Birch, Stewart, Kolasch & Birch

[57] ABSTRACT

A pressure sensor of the field-effect type includes a transistor having a gate insulation film above which a hollow chamber is provided, a gate electrode movable and deformable by pressure is formed above the gate insulation film through the hollow chamber, and an auxiliary gate electrode is provided on the boundary plane between the gate insulation film and hollow chamber, whereby the value of pressure can be detected by the drain-current variation of the transistor.

3 Claims, 2 Drawing Sheets

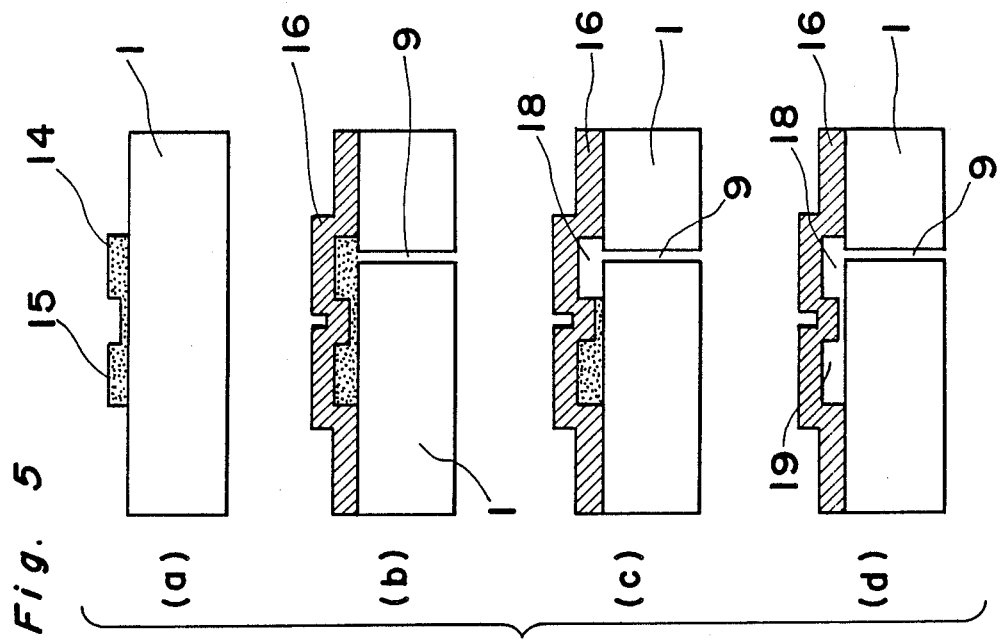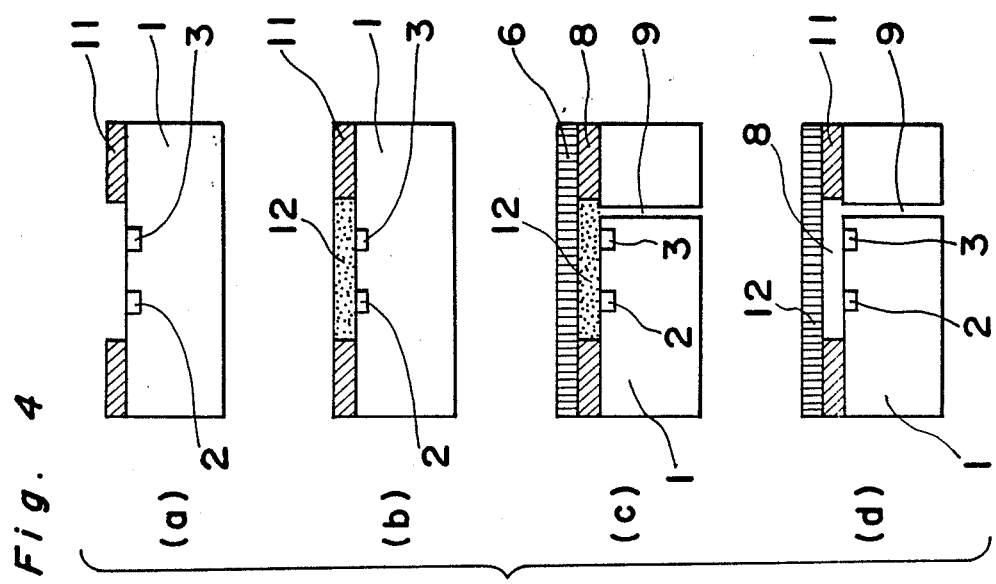

FIELD EFFECT PRESSURE SENSOR

This application is a continuation of application Ser. No. 227,489, filed on Aug. 1, 1988, now abandoned, which is a continuation of application Ser. No. 921,196, filed on Oct. 21, 1986, now abandoned.

BACKGROUND OF THE INVENTION

2. Field of the Invention

The present invention relates to a pressure sensor which is capable of detecting the pressure difference from a reference atmosphere in air or in liquid in terms of an electric signal output.

2. Description of the Prior Art

Conventionally, pressure measurement by use of mechanical changes of a Bourdon's tube, bellows, diaphragm or the like has been performed for measurement in the atmosphere or liquid. It is generally used extensively because of its low cost and simplicity. With the development of electronics technology, the development of pressure sensor is desired which measures pressure changes as an electric signal output in order to interact readily with electronic devices. The pressure sensor which measures pressure changes in terms of an electric signal output is capable of being easily connected with a data processing system and is simple in automatic measurement and control. Also, outputting of measurement values directly as electric signals enables measurement of pressures with high accuracy, provides quicker response speed, and makes it easier to provide a sensor of smaller size and lighter weight.

Accordingly, various types of pressure sensors have been studied and developed, as listed below:

(1) Pressure sensor with a metal foil strain gauge being mounted on a metal diaphragm.
(2) Silicon diaphragm pressure sensor
(3) Pressure sensor using piezoelectric material such as PVDF or ZnO.
(4) Quartz pressure sensor
(5) Pressure sensor using capacitance changes In such conventional pressure sensors as described above, the pressure sensor (1) with a metal foil strain gauge mounted on a metal diaphragm uses the changes in the electric resistance of the metal foil through the strain of the metal foil through deformation of the diaphragm by pressure. The advantage is that high pressures may be measured, also the temperature characteristics and the material property are superior. However, the disadvantage is that the sensitivity is poor and reduction in size and weight is difficult.

The silicon diaphragm pressure sensor (2) uses the piezoresistance effect in which the specific resistance of Si changes when pressure is applied upon the Si crystal. This pressure sensor, which uses Si as a material, may be mass-produced and is likely to be integrated with peripheral circuits by the use of semiconductor technology, while a temperature compensation circuit is required, because it depends largely upon temperature. A pressure sensor with a temperature compensation circuit formed integral with the Si pressure sensor on the same Si substrate is manufactured. But the pressure sensor of this type has disadvantages in that it is expensive and that the sensor element can be easily damaged due to the poor mechanical strength of the Si diaphragm.

The pressure sensor (3) using piezoelectric material such as PVDF or ZnO is a pressure sensor using the piezoelectric effect in which piezoelectric materials generate electromotive force when deformed by pressure. The advantage is that the pressure sensor is small in size and light in weight and that its output is large. The disadvantage is that the detection accuracy is poor and that noise caused by vibrations are likely to be picked up.

The quartz pressure sensor (4) uses the property of quartz whose oscillation frequency linearly changes with pressure. The disadvantage is that it is expensive, and reduction in size and weight is difficult.

The pressure sensor (5) detects the movement of a diaphragm an electrostatic capacitance variation. Recently, an ultra-small electrostatic capacitance variation type pressure sensor using an Si diaphragm was developed. It is pointed out that the ultra-small electrostatic capacitance variation type pressure sensor is more sensitive and stable than an Si pressure sensor using the piezoresistance effect. The disadvantage is that the ultra-small sensor has an extremely small value of electrostatic capacitance, i.e., the impedance is extremely high and is likely to be influenced by external noise.

As described hereinabove, the conventional pressure sensors are not sufficient in performance or price and have various problems that have to be solved before being put into practical use.

Two of the present inventors have proposed a novel and useful pressure sensor as U.S. patent application Ser. No. 838,838, filed on Mar. 12, 1986, and assigned to the same assignee, which may be manufactured in ultra-small size and at low cost by semiconductor technology through the use of a field effect transistor.

In the field effect pressure sensor proposed previously by the present assignee, a hollow chamber is provided in the upper portion of the gate insulating film of the field effect transistor, and the gate electrode, which may be movably deformed by pressure, is formed on the gate insulating film through the hollow chamber. The gate electrode provided through the hollow chamber on the gate insulating film is movably deformed by pressure so that the distance between the gate electrode and the gate insulating film changes to cause the electrode field intensity applied to the channel to vary. As a result, the pressure is detected in terms of the drain current variation of the field effect transistor.

In the field effect pressure sensor previously proposed by the present applicant, the gate electrode provided through the hollow chamber on the gate insulation film as described hereinabove is movably deformed by pressure so that the distance between the gate electrode and the gate insulating film changes to cause the field intensity applied upon the channel to vary. Consequently, the pressure is adapted to be detected in terms of the drain current variation of the field effect transistor. After various examinations, the output variation through temperature variation and aging variation is comparatively large.

Namely, in the field effect pressure sensor previously proposed by the present applicant, an absolute pressure type of pressure sensor is constructed which is adapted to keep the hollow chamber under a constant pressure or vacuum.

The absolute pressure type of field effect pressure sensor retains the hollow chamber under constant pressure or vacuum to use the movable deformation of the metallic film diaphragm on the upper portion of the gate insulating film through pressure variation of the outer atmosphere. In the absolute pressure type of pressure sensor, the hollow chamber is required to be normally kept at constant pressure or in a vacuum independently of variation aging to cause the hollow chamber to be completely air-tight. The spacer material for forming the hollow chamber has to be strictly selected, and the adherence property between the spacer and the metallic film diaphragm is required to be made sufficiently higher.

Furthermore, when the closed hollow chamber is constructed to be set under a constant pressure, the pressure changes through the temperature of the hollow chamber are large, and the metallic diaphragm is displaced because of temperature changes to cause the output of the field effect transistor to vary.

SUMMARY OF THE INVENTION

Accordingly, an object of the present invention is to provide a novel and useful pressure difference type of field effect pressure sensor which improves the field effect pressure sensor previously proposed so that output variations through temperature changes and aging may be controlled to a minimum.

In order to achieve the above-described object, the field effect pressure sensor of the present invention has a hollow chamber in the upper portion of the gate insulation film of a field effect transistor having a semiconductor substrate, a gate electrode which may be movably deformed by pressure on the hollow chamber, and an orifice which connects the hollow chamber with the outer portion.

In such arrangements as described hereinabove, the gate electrode provided through the hollow chamber on the gate insulating film is movably deformed by the pressure difference between the measurement atmosphere and the hollow chamber communicated with the open air as a reference atmosphere to change the field intensity to be applied upon the channel. As a result, the pressure difference is detected as a drain current variation of the field effect transistor.

Also, the orifice is provided in the semiconductor substrate so that the pressure sensor is provided as a pressure difference type of pressure sensor with the hollow chamber being communicated with the outer portion. The diaphragm is displaced only when a pressure difference has been caused without application of the pressure upon the gate electrode, which is composed of the diaphragm, as in the absolute pressure type pressure sensor. Thus, no distortions are normally caused in the diaphragm or in the spacer forming the hollow chamber. As a result a sensor of longer service life which does not change in strength because of temperature variations and aging can be obtained.

BRIEF DESCRIPTION OF THE DRAWINGS

These and other objects and features of the present invention will become apparent from the follow description taken in conjunction with the preferred embodiments thereof with reference to the accompanying drawings, in which:

FIG. 4 and FIG. 5 show, respectively, cross-sectional views of the process of making the hollow chamber by the use of the poly-α-methylstyrene to be employed in the present invention.

DETAILED DESCRIPTION OF THE INVENTION

Figure 3:
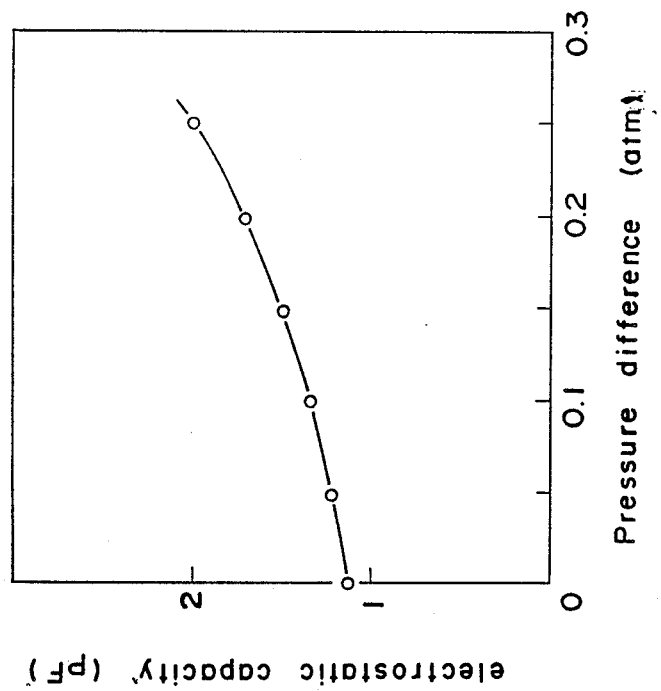
FIG. 3 is a graph showing the pressure-electrostatic capacitance characteristics of a capacitor, which perceives the pressure, constructed on the upper portion of the gate region of the field effect transistor.

Before the description of the present invention proceeds, it is to be noted that like parts are designated by like reference numerals throughout the accompanying drawings.

Referring now to the drawings, there is shown a field effect pressure sensor according to the present invention, which has characteristics such that the drain current of the field effect transistor is changed by the electric field applied upon the channel, and the gate electrode of the channel is provided as a lower-portion (auxiliary) gate electrode directly on the gate insulating film, and an upper-portion gate electrode communication with the lower portion through a hollow chamber so that the upper-portion gate electrode is movably varied by a pressure difference between the measurement atmosphere and the reference atmosphere of the hollow chamber to vary the electrostatic capacitance of a capacitor composed of the upper-portion gate electrode and the lower-portion gate electrode so as to change the field intensity applied upon the channel.

Figure 1:
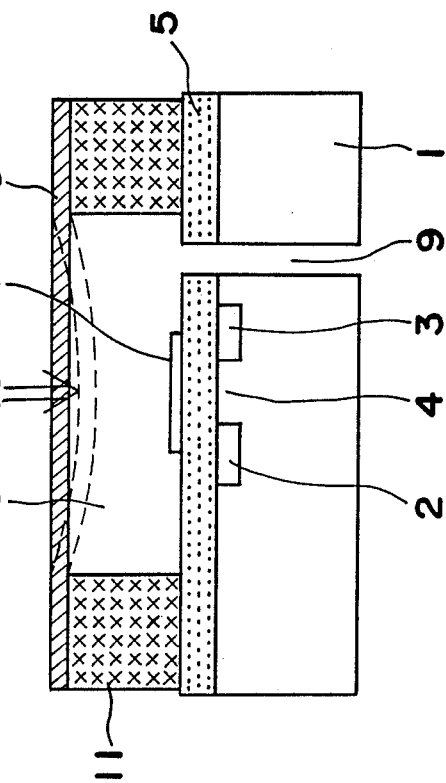
FIG. 1 is a cross-sectional view showing the construction of a pressure difference type of field effect pressure sensor in one embodiment of the present invention.

The field effect pressure sensor of the present invention will be described in further detail with reference to a first embodiment of FIG. 1. Referring to FIG. 1, a silicon substrate is designated by numeral 1, a source by numeral 2, a drain by numeral 3, a channel by numeral 4, a gate insulating film or a gate insulation membrane by numeral 5, an upper-portion electrode (diaphragm) by numeral 6, an auxiliary (lower-portion) gate electrode by numeral 7, and a hollow chamber or a cavity by numeral 8. An orifice 9 communicates the outer portion of the silicon substrate 1 with the hollow chamber 8. Also, the pressure difference between the measurement and the hollow chamber 8 is designated by numeral 10.

As shown in FIG. 1, the field effect pressure sensor in accordance with the present invention is constructed such that the auxiliary electrode, i.e., lower-portion gate electrode 7 is formed on the gate insulating film 5 in addition to a spacer 11 coated thereon. After the spacer 11 on the gate region has been removed by etching, the upper-portion electrode 6 composed of a metallic film is formed on the remaining spacer 11. Also, an orifice 9 is kept open in the silicon substrate 1 so that the hollow chamber 8 is adapted to communicate with the reference atmosphere, that is, the outer portion thereof.

In the field effect pressure sensor constructed as described hereinabove, the upper portion of the gate insulating film 5 is provided as part of the hollow chamber 8, and a capacitor is formed by the upper-portion gate electrode 6 and the lower-portion gate electrode 7 made of metallic film. The hollow chamber 8 communicates with the reference atmosphere through the orifice 9 in the silicon substrate. The metallic film diaphragm, which is the upper-portion gate electrode 6, is movably varied by the pressure difference between the measurement atmosphere and reference atmosphere. When the diaphragm is displaced by the pressure difference, the electrostatic capacitance between the upper-portion gate electrode 6 and the lower-portion gate electrode 7 changes in proportion with the pressure difference to cause the drain current $I_D$ to change in accordance with the following equation.

$$I_D = \frac{W \cdot \mu \cdot C_{mix}}{2L} (V_G - V_{TH})^2$$

wherein:

$\mu$: carrier mobility

W, L and $V_{TH}$: channel width, channel length and threshold voltage, respectively, of the field effect transistor $V_G$: gate voltage $C_{mix}$: an electrostatic capacitance Ci of the gate insulating film 5 and an electrostatic capacitance $C_{cav}$ of the hollow chamber 8, namely, a mixed electrostatic capacitance through the series connection of the electrostatic capacitance to be formed at the hollow interval of the lower-portion gate electrode 7 and the upper-portion gate electrode 6.

The mixed capacitance $C_{mix}$ can be calculated with the formula:

$$C_{mix} = \frac{Ci \cdot C_{cav}}{Ci + C_{cav}}$$

The hollow chamber capacitance $C_{cav}$ varies with the distance between the lower-portion gate electrode 7 and the upper-portion gate electrode 6 as described hereinabove. The distance varies depending upon the pressure difference between the measurement atmosphere and the reference atmosphere.

The field effect pressure sensor detects pressure with the variation in drain current of the field effect transistor, the output indicating how the electrostatic capacitance changes by pressure difference. It is difficult to detect pressure variation through direct measurement of the electrostatic capacitance, it is as small as several pF. But since the field effect transistor and the capacitor are integrated, and the pressure variation is detected as a drain current variation, the output impedance of the element may be lowered, the influence of noise or the like is reduced, and the pressure measurement becomes easier. Furthermore, the field effect pressure sensor amplifies the electrostatic capacitance variation to detect it as a drain current variation, so that the pressure may be measured with high sensitivity. Also, as the pressure measurement range and the sensitivity are determined mainly by the material quality and thickness of the metallic diaphragm and the size of the hollow chamber, the measurement pressure range may be freely set from a very small amount of pressure to a large pressure through the proper selection of the metallic film material.

In the field effect pressure sensor having a lower-portion gate electrode 7 as described, the lower-portion gate electrode 7 is formed directly on the gate insulating film 5 so that the DC voltage for operating the transistor may be applied through the lower-portion gate electrode 7 without changes in the transistor characteristics and drifts of the drain current.

Also, since the hollow chamber 8 is communicated with the reference atmosphere through the orifice 9, the hollow chamber 8 is not required to be kept constant in pressure or in a vacuum, and thus does not have to be air tight. Also, the pressure within the hollow chamber 8 is not largely influenced by variations in temperature. As the diaphragm is displaced only when pressure difference has been caused without constant application of pressure upon the diaphragm as in the absolute pressure type of pressure sensor, distortion is not caused normally on the diaphragm or the spacer.

The field effect pressure sensor of the present invention is described in connection with a second embodiment of FIG. 2 hereinafter. The second embodiment of the sensor provides either a hollow chamber or an insulating layer which is expandable or contractable by pressure on the upper portion of the gate insulation film, a gate electrode which may be movably deformed by pressure is formed above said gate insulating film through the hollow chamber or the insulating layer, an auxiliary gate electrode is additionally provided at the interface between the expandable film and the gate insulating film, the hollow chamber or the gate insulating film. The pressure is adapted to be detected as the drain current variation of the field effect transistor.

In the above described arrangements, the upper-portion gate electrode provided through the hollow chamber of the insulating layer which may be expanded or contracted, is movably deformed by pressure so that the distance between the upper-portion gate electrode and the lower-portion gate electrode changes to cause the field intensity, which is applied upon the channel, to change. As a result, the pressure is detected as the drain current variation of the field effect transistor. Also, a DC voltage for operating the field effect transistor is applied through the lower-portion gate electrode to prevent the characteristics of the transistor from being changed and the drain current to drift.

Figure 2:
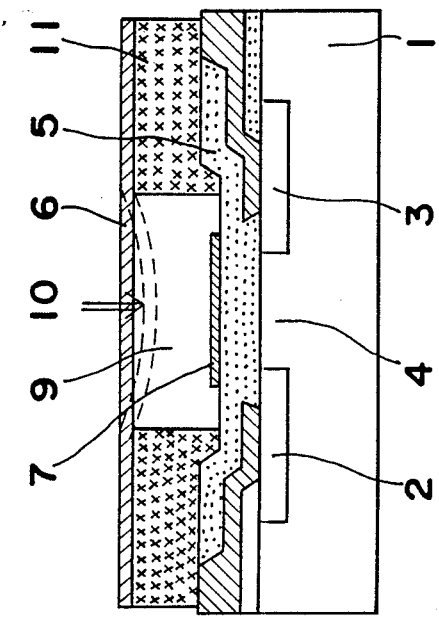
FIG. 2 is a cross-sectional view showing the construction of the field effect pressure sensor in another embodiment of the present invention.

FIG. 2 shows the construction of the field effect pressure sensor in connection with the second embodiment of the present invention. Referring to FIG. 2, a silicon substrate is designated by numeral 1, a source by numeral 2, a drain by numeral 3, a channel by numeral 4, a gate insulating film by numeral 5, an upper-portion gate electrode by numeral 6, an auxiliary gate electrode by numeral 7, a hollow chamber by numeral 9, and a pressure force by numeral 10.

As shown in FIG. 2, the field effect pressure sensor in accordance with the present invention has an auxiliary electrode (i.e., lower-portion gate electrode) 7 on the gate insulating film 5 of the field effect transistor, furthermore, a spacer 11 is coated thereon. After the spacer on the gate region has been removed by etching, the upper-portion gate electrode 6 composed of a metallic film is formed on the remaining spacer 11.

In the field effect pressure sensor of such arrangement as described hereinabove, the gate upper-portion electrode forms part of the hollow chamber 9. The upper-portion gate electrode 6 forms a capacitor with the lower-portion gate electrode 7. The metallic film, which is the upper-portion gate electrode 6, operates as a diaphragm which is movably deformed by the pressure difference between the hollow chamber 9 and the outer atmosphere. When the diaphragm is displaced by the pressure difference, the electrostatic capacitance causes the drain current $I_D$ to change on the basis of the equation set forth above.

Assume that the hollow chamber 9 is cylindrical, its diameter is 1 mm, the thickness of the spacer 10 is 3 $\mu$m, the diameter of the circular lower-portion gate electrode 7 is 0.7 mm, the metallic film diaphragm constituting the upper-portion gate electrode 6 is copper, its thickness is 10 $\mu$m, and the electrostatic capacitance of the capacitor composed of the metallic film 6 and the lower portion gate electrode 7 changes as shown in FIG. 3 because of the pressure difference between the hollow chamber 9 and the outer atmosphere. The electrostatic capacitance, when a pressure difference does not occur is 1.13 pF. As pressure of the outer atmosphere becomes higher by 0.2 atm than the hollow chamber, the diaphragm 6 is bent onto the side of the hollow chamber 8, so that the electrostatic capacitance increases to 1.72 pF, which is 1.52 times.

The field effect pressure sensor detects the pressure as an output change of the drain current in the field effect transistor caused by the change in electrostatic capacitance between the lower-portion gate electrode 7 and the upper-portion gate electrode (i.e., metallic film diaphragm) 6. It is difficult to detect the pressure variation through the direct measurement of the electrostatic capacitance because the electrostatic capacitance is as small as several pF.

In the field effect pressure sensor of the present invention, a hollow chamber is provided on the base plate, a stationary electrode is formed in the lower portion of the hollow portion, and a moving electrode is formed in the upper portion of the hollow chamber. In order to make such hollow chamber, a film of sublimation or heat-decomposition material patterned in a particular shape is formed on the substrate, the patterned film is covered with an organic material and/or an inorganic material having heat-resisting properties. Thereafter, the sublimation or heat-decomposition material is heated, and is removed through the orifice to make a minute hollow chamber.

In the present invention, material which sublimates or decomposes through heating is used. These materials are evaporated and removed through the orifice through the heating operation to make the hollow. Naphthalene, camphor, ammonium formate, iodine, poly-α-methylstyrene or the like can be used as sublimation or decomposition material. A case where the poly-α-methylstyrene is used will be described hereinafter as an example.

FIG. 4 shows process views for forming the minute hollow on the field effect transistor by the use of poly-α-methylstyrene. The insulating film 11 of $SiO_2$, $Si_3N_4$ or the the like, which becomes a spacer is formed on the silicon substrate 1 to etch (FIG. 4(a)) the insulation film on the gate region of FET. The methyl cellosolve acetate solution of poly-α-methylstyrene is spin-coated the silicon wafer to form the film. The poly-α-methylstyrene is leveled and etched to surround with the insulating film of the spacer the periphery of the poly-α-methylstyrene 12 shown in FIG. 4(b) so that the poly-α-methylstyrene and the insulating film become equal in thickness. Furthermore, aluminum, nickel or $SiO_2$ 6 is formed on these films, and thereafter the orifice 9 is provided (FIG. 4(c)) in the end portion of the patterned poly-α-methylstyrene through the etching of the silicon from the reverse face of the silicon wafer. Finally, the poly-α-methylstyrene 12 is decomposed and removed FIG. 4 (c) through the orifice by the heating operation at a temperature of 150° C. or more in a vacuum to form the minute hollow on the FET 8 (FIG. 4(d)). When the hollow is made by the use of poly-α-methylstyrene as shown in FIG. 4(d), the orifice may be provided in the hollow end portion. Furthermore, the hollow may be easily made even when the hollow shape is complicated. This will be described in FIG. 5 in the other embodiment. FIG. 5(a) shows that the poly-α-methylstyrene is patterned so that two hollows may be continued on the substrate. The Al film or Ni film is laminated on the patterned poly-α-methylstyrene 14, 15, thereafter only the reverse face of one hollow portion of two portions is etched to form (FIG. 5(b)) the orifice 9 in the substrate. Thereafter, vacuum heating is performed at the temperature of 150° C. so that the poly-α-methylstyrene of the hollow 18 is decomposed and removed to form the hollow 18 (FIG. 5(c)). Through the further vacuum heating operation, the poly-α-methylstyrene of the continuous hollow portion 19 is also decomposed, removed to form the continuous two hollows 18, 19 (FIG. 5(d)). If the orifice communicated with the outer portion is one which is hollow even when the shape of the hollow is complicated like this, the hollow may be formed by the heating operation. The poly-α-methylstyrene is used as a polymer of about 360 in polymerization in these embodiments, but the polymerization degree of the poly-α-methylstyrene is desirable from about 50 to about 5,000 in range. When the polymerization is too low, the softening point of the poly-α-methylstyrene becomes lower, the pattern precision becomes worse in the pattern formation. Also, when the polymerization degree is high, the viscosity of the solution becomes so large that coating becomes difficult. In the method of forming the minute hollow through the material which is removed through sublimation or decomposition as described hereinabove, the hollow may be easily formed without the use of a wet type etching, furthermore hollows simple or complicated may be formed. This is extremely effective when devices are made using the hollows, such as pressure sensors.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A pressure sensor, comprising:
    a field effect transistor, including,
        a semiconductor substrate,
        a source region and a drain region formed in said semiconductor substrate,
        a channel formed between said source and drain regions,
        a gate insulation film formed over said source, drain and channel regions,
        an auxiliary gate electrode formed over a portion of said gate insulation film,
        an upper gate electrode formed above said auxiliary gate electrode, and
        a spacer located between said upper and auxiliary gate electrodes;
    said upper gate electrode, spacer and gate insulation film forming boundaries of a hollow chamber located between said upper and auxiliary gate electrodes, said hollow chamber being in communication with an outside surface of said substrate through an orifice extending through said semiconductor substrate and said gate insulation film;
    said upper and auxiliary gate electrodes forming an electrostatic capacitor, said upper gate electrode being deformable with pressure to vary the distance between said upper and auxiliary gate electrodes to change the electrostatic capacitance of said capacitor;

a pressure difference between the pressure on said upper gate electrode and the pressure communicated to said hollow chamber by said orifice being detected as a variation in drain current of said filed effect transistor.

2. The pressure sensor as defined in claim 1, wherein the hollow chamber is formed by removing through heating a membrane material having a property of sublimation or heat-decomposition which is provided on said insulation film with patterning of a predetermined configuration and covered by an organic and/or inorganic material of resistance to heat.

3. The pressure sensor as defined in claim 2, wherein the membrane material is poly-$\alpha$-methylstyrene having a polymerization degree of the range from 50 to 5,000.

* * * * *